United States Patent
Gupte et al.

(10) Patent No.: US 9,471,630 B2
(45) Date of Patent: Oct. 18, 2016

(54) EFFICIENT QUERY PROCESSING ON ORDERED VIEWS

(75) Inventors: Ajaykumar B. Gupte, San Jose, CA (US); Raghupathi K. Murthy, Union CIty, CA (US); Joaquim A. Zuzarte, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/413,535

(22) Filed: Mar. 6, 2012

(65) Prior Publication Data

US 2013/0238637 A1 Sep. 12, 2013

(51) Int. Cl.
*G06F 7/00* (2006.01)
*G06F 17/30* (2006.01)

(52) U.S. Cl.
CPC ... *G06F 17/30451* (2013.01); *G06F 17/30448* (2013.01); *G06F 17/30489* (2013.01)

(58) Field of Classification Search
None
See application file for complete search history.

(56) References Cited

U.S. PATENT DOCUMENTS

| | | | | |
|---|---|---|---|---|
| 5,276,870 | A * | 1/1994 | Shan et al. | |
| 5,619,692 | A * | 4/1997 | Malkemus et al. | |
| 6,480,850 | B1 * | 11/2002 | Veldhuisen | 707/610 |
| 6,546,382 | B1 * | 4/2003 | Amor | G06F 17/30451 |
| 7,693,820 | B2 | 4/2010 | Larson et al. | |
| 7,765,207 | B2 * | 7/2010 | Fang et al. | 707/728 |
| 7,908,242 | B1 * | 3/2011 | Achanta | 707/602 |
| 7,945,560 | B2 | 5/2011 | Ahmed et al. | |
| 2004/0064466 | A1 * | 4/2004 | Manikutty et al. | 707/100 |
| 2004/0073546 | A1 * | 4/2004 | Forster et al. | 707/4 |
| 2004/0117359 | A1 * | 6/2004 | Snodgrass et al. | 707/3 |
| 2004/0220896 | A1 * | 11/2004 | Finlay et al. | 707/1 |
| 2006/0235840 | A1 * | 10/2006 | Manikutty et al. | 707/4 |
| 2007/0083489 | A1 | 4/2007 | Lawande | |
| 2007/0226203 | A1 * | 9/2007 | Adya et al. | 707/4 |
| 2007/0239656 | A1 * | 10/2007 | Santosuosso | 707/2 |
| 2008/0021868 | A1 * | 1/2008 | Muras et al. | 707/2 |
| 2008/0147596 | A1 * | 6/2008 | McKenna et al. | 707/2 |
| 2009/0259624 | A1 * | 10/2009 | DeMaris et al. | 707/3 |
| 2010/0030726 | A1 * | 2/2010 | Chandrasekar et al. | 707/2 |
| 2011/0213766 | A1 * | 9/2011 | Hong et al. | 707/718 |

OTHER PUBLICATIONS

Scott, John. "Views and Order By." John's Blog. Accessed online at: [http://jes.blogs.shellprompt.net/2010/02/25/views-and-order-by/]. Internet Archive records, with published date of Mar. 24, 2010, [https://web.archive.org/web/20100324145456/http://jes.blogs.shellprompt.net/2010/02/25/views-and-order-by/].*

(Continued)

*Primary Examiner* — Jason Liao
*Assistant Examiner* — David T Brooks
(74) *Attorney, Agent, or Firm* — North Shore Patents, P.C.; Lesley A. Leonessa (57) ABSTRACT

The efficient query processing on ordered views includes: obtaining a view definition for a view for database data; obtaining a query to be executed on the database data; identifying any columns in the view that are unnecessary for the query; after processing any predicates of the query, identifying any sorts in the view definition that are unnecessary or redundant in the query; rewriting the query to eliminate the unnecessary columns and unnecessary and redundant sorts; and executing the rewritten query without materializing the view. Thus, the query is rewritten in a way that avoids materializing the view and eliminates duplicate or unnecessary sorts. This reduces the number of rows to be sorted and eliminates unnecessary columns from materialization. These reductions lead to resource savings, including memory, temporary table space required for sorting, and CPU resources.

20 Claims, 10 Drawing Sheets

(56) References Cited

OTHER PUBLICATIONS

SAP. "Performance and Efficient View Descriptor." SAP/ACCESS Software for Relational Databases. Accessed online at: [http://www.okstate.edu/sas/v7/sashtml/books/acesrd/pevd.htm]. Internet Archive records, with published date of Jul. 2, 2004, [https://web.archive.org/web/20040702171750/http://www.okstate.edu/sas/v7/sashtml/books/acesrd/pevd.htm].*

* cited by examiner

SINGLE OR MULTIPLE TABLES, SINGLE VIEW

Creation 401:
create table t1(c1 int, c2 int, c3 int, c4 int, c5 int, c6 int);
create view v1 (vc1,vc2,vc3,vc4,vc5) as select c1,c2,c3,c4,c5 from t1 order by c1 asc, c2 desc;

Query Q1.0:
select first 10 vc1, vc2 from v1 where vc1 > 100 and vc2 < 200;

Rewritten query RQ1.0:
select first 10 c1, c2 from t1 where c1 > 100 and c2 < 200 order by c1 asc, c2 desc;

JOIN TABLE CASE

Creation 402:
create view v1 (vc1,vc2,vc3,vc4,vc5) as select c1,c2,c3,c4,c5 from t1 order by c1 desc ;
create table t2 (col1 int, col2 int);

Query Q1.1:
select first 10 t2.col1, vc2 from t2, v1 where t2.col1 = v1.vc2 and t2.col2 > 100 and vc2 < 200

Rewritten Query RQ1.1:
select first 10 t2.col1, t1.c2 from t2, t1 where t2.col1 = t1.c2 and t2.col2 > 100 and t1.c2 < 200

FIG. 4A

VIEW WITH ORDER BY NOT IN SELECT LIST CLAUSE, SINGLE OR MULTIPLE TABLES

Creation 403:
create view v1 (vc1,vc2,vc3,vc4,vc5) as select c1,c2,c3,c4,c5 from t1 order by c6 desc;

Query Q2.0:
select skip 10 first 10 vc1, vc2 from v1 where vc1 > 100 and vc2 < 200;

Rewritten query RQ2.0:
select skip 10 first 10 c1, c2 from t1 where c1 > 100 and c2 < 200 order by c6 desc;

JOIN TABLE CASE

Creation 404:
create view v1 (vc1,vc2,vc3,vc4,vc5) as select c1,c2,c3,c4,c5 from t1 order by c6;
create table t2 (col1 int, col2 int);

Query Q2.1:
select first 10 t2.col1, vc2 from t2, v1 where t2.col1 = v1.vc2 and t2.col2 > 100 and vc2 < 200

Rewritten Query RQ2.1:
select first 10 t2.col1, t1.c2 from t2, t1 where t2.col1 = t1.c2 and t2.col2 > 100 and t1.c2 < 200

FIG. 4B

QUERY HAVING SAME ORDER BY CLAUSE AS VIEW

Creation 405:
create view v1 (vc1,vc2,vc3,vc4,vc5) as select c1,c2,c3,c4,c5 from t1 order by c1;

Query Q3.0:
select vc1, vc2 from v1 where vc1 > 100 and vc2 < 200 order by vc1;

Rewritten query RQ3.0:
select c1, c2 from t1 where c1 > 100 and c2 < 200 order by c1;

JOIN TABLE CASE

Creation 406:
create view v1 (vc1,vc2,vc3,vc4,vc5) as select c1,c2,c3,c4,c5 from t1 order by c1;
create table t2 (col1 int, col2 int);

Query Q3.1:
select vc1, vc2, t2.col1 from t2, v1 where t2.col1 = v1.vc1 and vc1 > 100 and vc2 < 200 order by vc1;

Rewritten Query RQ3.1:
select t1.c1, t1.c2, t2.col1 from t2, t1 where t2.col1 = t1.c1 and t1.c1 > 100 and t1.c2 < 200 order by t1.c1;

FIG. 4C

QUERY HAVING DIFFERENT ORDER BY CLAUSE FROM VIEW

Creation 407:
create view v1 (vc1,vc2,vc3,vc4,vc5) as select c1,c2,c3,c4,c5 from t1 order by c1;

Query Q4.0:
select vc1, vc2 from v1 where vc1 > 100 and vc2 < 200 order by vc2;

Rewritten query RQ4.01 (composite column sorting):
select c1, c2 from t1 where c1 > 100 and c2 < 200 order by c2, c1;

Rewritten query RQ4.02 (remove lower level sorting):
select c1, c2 from t1 where c1 > 100 and c2 < 200 order by c2;

JOIN TABLE CASE

Creation 408:
create view v1 (vc1,vc2,vc3,vc4,vc5) as select c1,c2,c3,c4,c5 from t1 order by t1.c1;
create table t2 (col1 int, col2 int);

Query Q4.1:
select vc1, vc2, t2.col1 from t2, v1 where t2.col1 = v1.vc1 and vc1 > 100 and vc2 < 200 order by t2.col1;

Rewritten Query RQ4.11 (composite column sorting):
select t1.c1, t1.c2, t2.col1 from t2, t1 where t2.col1 = t1.c1 and t1.c1 > 100 and t1.c2 < 200 order by t2.col1, t1.c1;

Rewritten Query RQ4.12 (remove lower level sorting):
select t1.c2, t2.c1 from t2, t1 where t2.c1 = t1.c2 and t1.c2 > 100 and t2.c1 < 200 order by t2.c1;

FIG. 4D

MULTIPLE ORDER BY CLAUSES WITHIN NESTED VIEWS OR QUERIES

Creation 409:
create view v4 (vc1,vc2,vc3,vc4,vc5) as select c1,c2,c3,c4,c5 from t1 order by c4;
create view v3 (vc1,vc2,vc3,vc4,vc5) as select vc1,vc2,vc3,vc4,vc5 from v4 order by vc3;
create view v2 (vc1,vc2,vc3,vc4,vc5) as select vc1,vc2,vc3,vc4,vc5 from v3 order by vc2;
create view v1 (vc1,vc2,vc3,vc4,vc5) as select vc1,vc2,vc3,vc4,vc5 from v3 order by vc1;

Query Q5.0:
select t2.c1, vc5 from t2, v1 where t2.c1 = v1.vc5 and vc5 > 100 and t2.c1 < 200;

Rewritten query RQ5.0 (remove lower level sorting):
select t2.c1, t1.c5 from t2, t1 where t2.c1 = t1.c5 and t1.c5 > 100 and t2.c1 < 200;

Query Q5.1: (v1, v1, v3, v4 are same as above)
select t2.c1, vc1, vc2 from t2, v1 where t2.c1 = v1.vc1  and vc1 > 100 and t2.c1 < 200
order by t2.c1;

Rewritten query RQ5.1 (composite column sorting):
select t2.c1, t1.c1, t1.c2 from t2, t1 where t2.c1 = t1.c1 and t1.c1 > 100 and t2.c1 < 200
order by t2.c1, t1.c1, t1.c2;

Creation 410:
create view v1 (vc1,vc2,vc3,vc4,vc5) as select c1,c2,c3,c4,c5 from t1 order by c1;
create view v2 (vc1,vc2,vc3,vc4,vc5) as select c1,c2,c3,c4,c5 from t1 order by c1;

Query Q5.2:
select * from (select v1.vc1, dt2_c1, dt2_c2 from v1,
(Select t2.c1, v2.vc1 from t2, v2) as dt2 (dt2_c1, dt2_c2)) as dt1 (dt1_c1, dt1_c2,dt1_c3)
order by dt1_c1;

Rewritten Query RQ5.2 (lower level sorting):
Select * from (select t1.c1, dt2_c1, dt2_c2 from t1,
(Select t2.c1, t1.c1 from t2, t1) as dt2 (dt2_c1, dt2_c2)) as dt1 (dt1_c1, dt1_c2,dt1_c3)
order by dt1_c1;

FIG. 4E

Create 501:
create table t1 (c1 int, c2 int, c3 int, c4 int, c5 int, c6 int)
create table t2 (c1 int, c2 int);
create view v1 (vc1, vc2, vc3, vc4, vc5) as select c1, c2, c3, c4, c5 from t1 order by c1
create view v2 (vc1, vc2, vc3, vc4, vc5) as select c1, c2, c3, c4, c5 from t1 order by c1;

Query Q6.0:
select * from (select v1.vc1, dt2_c1, dt2_c2 from v1,
    (select t2.c1, v2.vc1 from t2, v2) as dt2 (dt2_c1, dt2_c2))
    as dt1 (dt1_c1, dt1_c2, dt1_c3) order by dt1_c1;

Rewritten Query RQ6.0:
Select * from (select t1.c1, dt2_c1, dt2_c2 from t1,
    (select t2.c1, t1.c1 from t2, t1) as dt2 (dt2_c1, dt2_c2))
    as dt1(dt1_c1, dt1_c2, dt1_c3) order by dt1_c1;

EFFICIENT QUERY PROCESSING ON ORDERED VIEWS

BACKGROUND

Many database systems do not support sorting clauses in database view defining statements. Many database customers want the ability to create a complex view with implicit sorting for reporting requirements and to hide the complexities of report queries, including ordering schemes, from the report user. However, since most databases do not support sorting clauses in view defining statements, the customer cannot create these kinds of canned views.

One reason sorting clauses are not supported in view defining statement is that the materialization of a view results in the creation of a large temporary table, with the sorting performed on the rows in the large temporary table. The report query is then created from the sorted temporary table. Even when the query is to return a small number of rows or columns from the temporary table, the entire temporary table would still need to be sorted. The creation of the temporary table, and the sorting of the rows in it, requires significant resources that impacts performance. The performance impact is increased when the view defining statement and the query together have multiple sorts, involve a table join, or involve nested views or queries.

SUMMARY

According to one embodiment of the present invention, a method for efficient query processing on ordered views by a computing device comprising a processor comprises: obtaining a view definition for a view for database data; obtaining a query to be executed on the database data; identifying any columns in the view that are unnecessary for the query; after processing any predicates of the query, identifying any sorts in the view definition that are unnecessary or redundant in the query; and rewriting the query to eliminate the unnecessary columns and unnecessary and redundant sorts.

In one aspect of the present invention, the method further comprises: executing the rewritten query without materializing the view.

In one aspect of the present invention, the identifying any sorts in the view definition that are unnecessary or redundant in the query comprises: processing the query predicates; determining that the view definition comprises one or more view sorts; determining whether the view sort is used in the query or affects query results; and in response to determining that the view sort is not used in the query and do not affect the query results, not applying the view sort to the query.

In one aspect of the present invention, the identifying any sorts in the view definition that are unnecessary or redundant in the query comprises: processing the query predicates; determining that the view definition comprises one or more view sorts; determining whether the view sort is used in the query or affects query results; in response to determining that the view sort is used in the query or does affect the query results, determining whether the query comprises one or more sorts; and in response to determining that the query does not comprise any sorts, applying the view sort to the query.

In one aspect of the present invention, the identifying any sorts in the view definition that are unnecessary or redundant in the query comprises: processing the query predicates; determining that the view definition comprises one or more view sorts; determining whether the view sort is used in the query or affects query results; in response to determining that the view sort is used in the query or does affect the query results, determining whether the query comprises one or more query sorts; in response to determining that the query comprises one or more query sorts, determining whether the view sort matches the query sort; and in response to determining that the view sort matches the query sort, not applying the view sort to the query.

In one aspect of the present invention, the identifying any sorts in the view definition that are unnecessary or redundant in the query further comprises: in response to determining that the view sort does not matches the query sort, not applying the view sort to the query.

In one aspect of the present invention, the identifying any sorts in the view definition that are unnecessary or redundant in the query further comprises: in response to determining that the view sort does not match the query sort, building a composite sort from the view sort and the query sort; and applying the composite sort to the query.

System and computer program products corresponding to the above-summarized methods are also described and claimed herein.

BRIEF DESCRIPTION OF THE SEVERAL VIEWS OF THE DRAWINGS

FIGS. 4A-4E illustrate example cases of efficient query processing on ordered views according to an embodiment of the present invention.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 1:
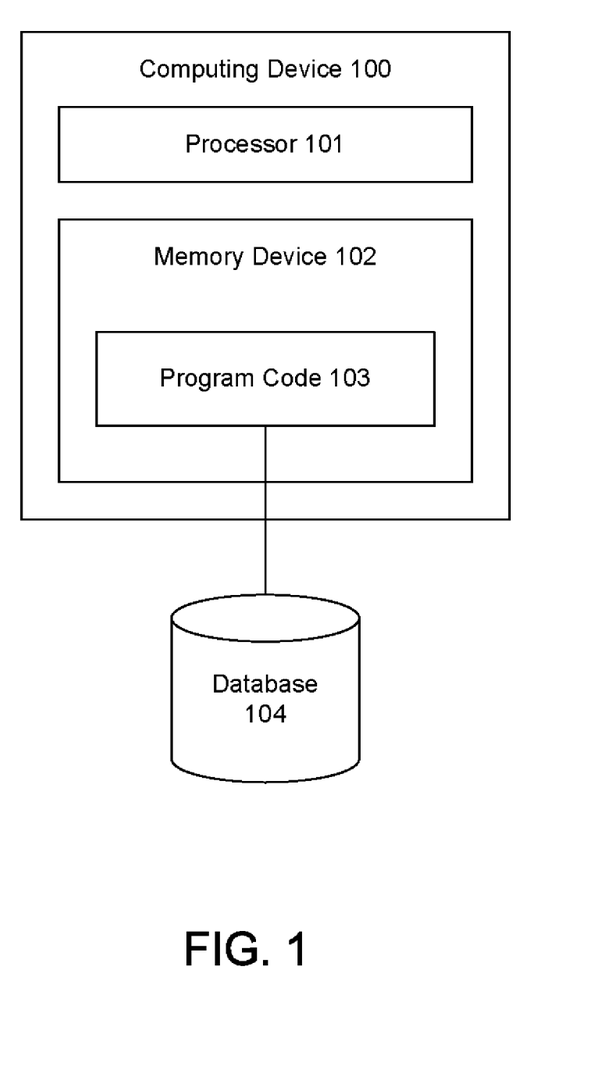
FIG. 1 illustrates an embodiment of a system for efficient query processing on ordered views according to the present invention.

FIG. 1 illustrates an embodiment of a system for efficient query processing on ordered views according to the present invention. The system comprises a computing device 100 that is operationally coupled to a processor 101 and a computer memory device 102. The computer memory device 102 stores computer readable program code 103 for implementing the method of the present invention. The processor 101 executes the program code 103 to efficiently process queries on tables of a database 104 with ordered views according to the various embodiments of the present invention.

Figure 2:
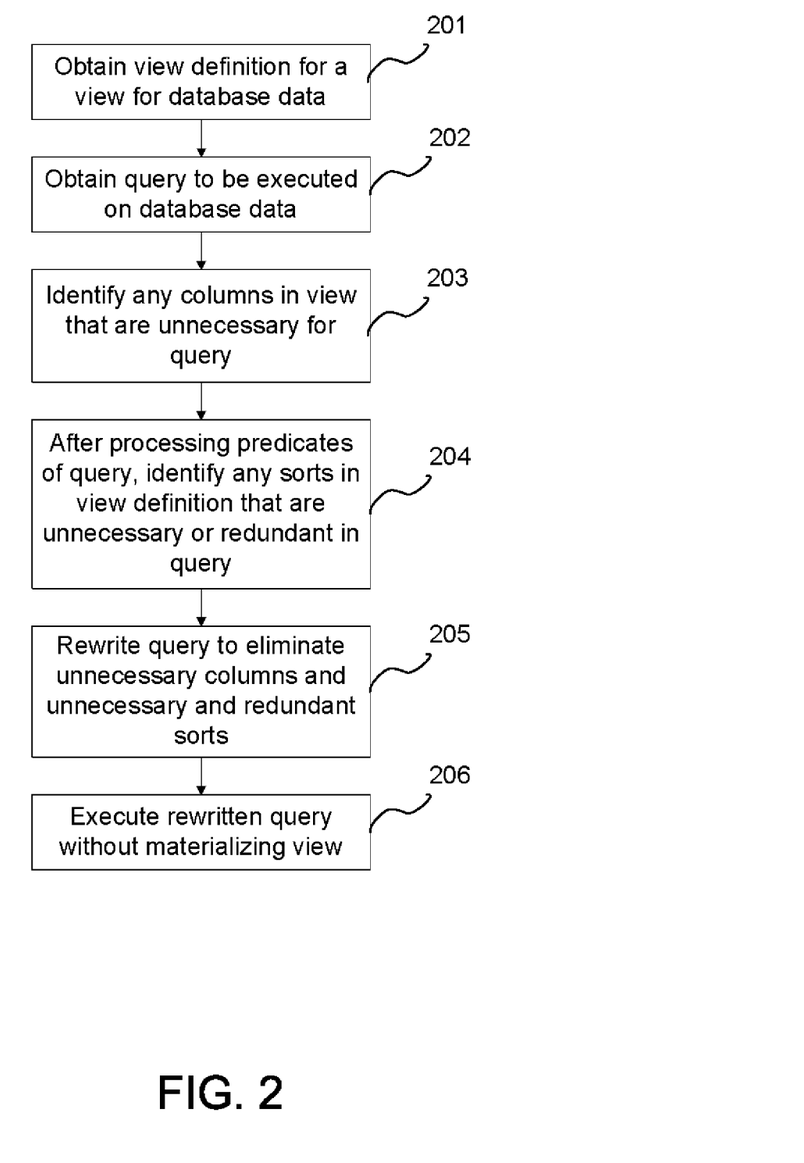
FIG. 2 illustrates a flowchart of an embodiment of a method for efficient query processing on ordered views according to the present invention.

FIG. 2 illustrates a flowchart of an embodiment of a method for efficient query processing on ordered views according to the present invention. First, the method obtains a view definition for the database data (201) and a query to be executed on the database data (202). In this embodiment, the database data refers to the raw table data comprising the database 104. The method then identifies any columns in the view that are unnecessary for the query (203). After processing any predicates of the query, the method identifies any sorts in the view definition that are unnecessary or redundant in the query (204). The method rewrites the query to eliminate the unnecessary columns and the unnecessary or redundant sorts, if any (205). The query can then be executed without materializing the view (206). Thus, the method rewrites the query in a way that avoids materializing the view and eliminates duplicate or unnecessary sorts. This reduces the number of rows to be sorted and eliminates unnecessary columns from materialization. These reductions lead to resource savings, including memory, temporary table space required for sorting, and CPU resources.

Figure 3:
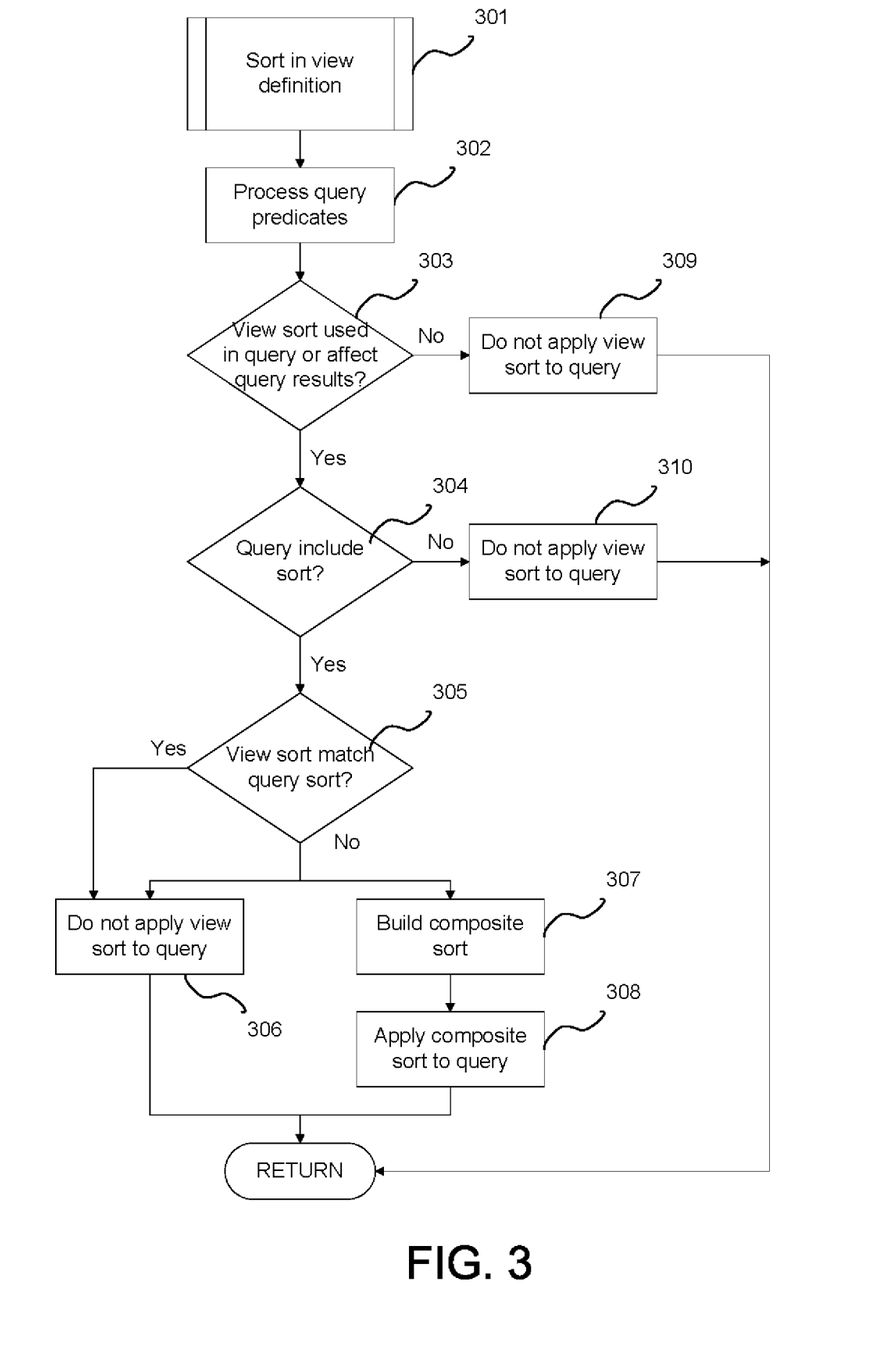
FIG. 3 illustrates a flowchart describing in more detail the identifying of sorts in the view definition that are unnecessary or redundant in the query, according to an embodiment of the present invention.

FIG. 3 illustrates a flowchart describing in more detail the identifying of sorts in the view definition that are unnecessary or redundant in the query, according to an embodiment of the present invention. When the view definition includes one or more sorts (301), the method first processes the query predicates (302), and then determines whether the sort in the view definition (view sort) is used in the query or affects the query results (303). In response to determining that the view sort is not used in the query and does not affect the query results, the method does not apply the view sort to the query when rewriting the query, as the view sort is unnecessary (309). In response to determining that the view sort is used in the query or affects the query results, the method determines whether the query includes a sort (query sort) (304). In response to determining that the query does not include a sort, the method does not apply the view sort to the query when rewriting the query (310). In response to determining that the query includes a sort, the method determines whether the view sort matches the query sort (305). In response to determining that the view sort matches the query sort, the method does not apply the view sort to the query when rewriting the query, since the view sort is redundant (306). In response to determining that the view sort does not match the query sort, the method can either decide to not apply the view sort to the query (306), i.e., remove lower level sorts, or decide to build a composite sort from the view sort and the query sort (307). The method applies the composite sort to the query when rewriting the query (308).

Figure 4A:
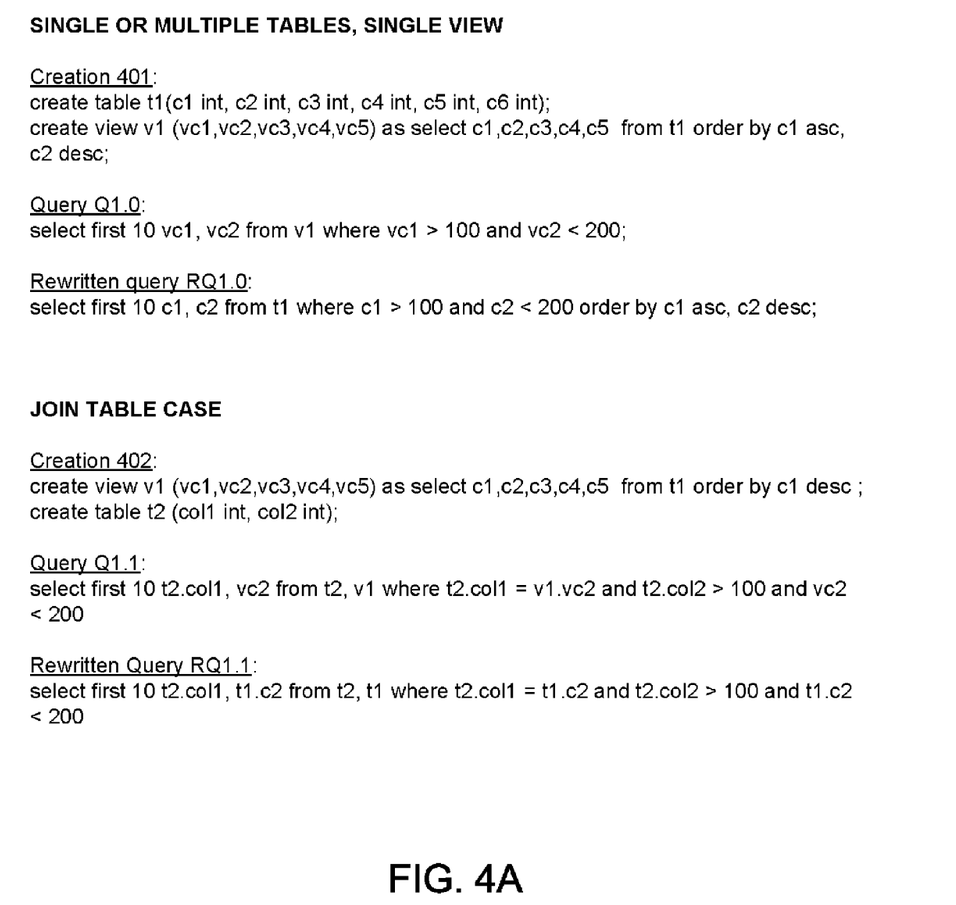

FIGS. 4A-4E illustrate example cases of efficient query processing on ordered views according to an embodiment of the present invention. FIG. 4A illustrates example creation statements 401 involving single or multiple tables and a single view. Illustrated are example view creation statements 401 for view v1 that includes columns from table t1, ordered by column c1 in ascending order and columns c2 in descending order. Also illustrated in an example select statement for the query Q1.0 for returning the first 10 rows of columns vc1 and vc2 from view v1. The query Q1.0 includes the predicates vc1>100 and vc2<200. After obtaining the view creation statements 401 (201) and the query Q1.0 (202), the method identifies the columns in the view v1 that are unnecessary for the query Q1.0 (203). In this embodiment, the method "folds" the view v1 into the query Q1.0, thus eliminating non-projected view columns. Here, the query is to return the first ten rows of columns vc1 and vc2 from view v1. Thus, all other columns of the view v1 are unnecessary or non-projected view columns. To process the sort in the view definition, the method first processes the query predicates (302), and then determines whether the view sort is used in the query Q1.0 or affects the query results (303). In this example, the view sort is performed based on table columns c1 and c2, which are projected view columns. Thus, the view sort is used in the query. In this example, there are no sorts in the view definition that are unnecessary or redundant to the query Q1.0, and the method proceeds to apply the view sort to the query Q1.0 (310). The method then rewrites the query Q1.0 to eliminate the unnecessary columns (205). The resulting rewritten query RQ1.0 can then be executed directly on the table t1, thus avoiding materializing the view v1. Further, the sort is performed on the data set returned by the rewritten query RQ1.0, which is a smaller data set than the view data set.

FIG. 4A further illustrates example view creation statements 402 with a query Q1.1 that requires a table join between table t1 and table t2. After obtaining the view creation statements 402 (201) and the query Q1.1 (202), the method identifies the columns in the view v1 that are unnecessary for the query Q1.1 (203). Here, the query returns the first 10 rows of column t2.col1 from table t2 and column vc2 from view v1. Thus, all other columns of the view v1 are unnecessary. To process the sort in the view definition, the method first processes the query predicates (302), and then determines whether the view sort is used in the query Q1.1 or affects the query results (303). In this example, the view sort is by column t1.c1, which is not used in the query Q1.1, i.e., it is a non-projected column. Thus, the view sort is unnecessary. In response, the method does not apply the view sort to the query Q1.1 (309). The method then rewrites the query Q1.1 to eliminate the unnecessary columns and the unnecessary view sort (205). The resulting rewritten query RQ1.1 can then be executed directly on tables t1 and t2, without materializing the view v1. Further, the sort in the view is eliminated from the execution of the query.

Figure 4B:
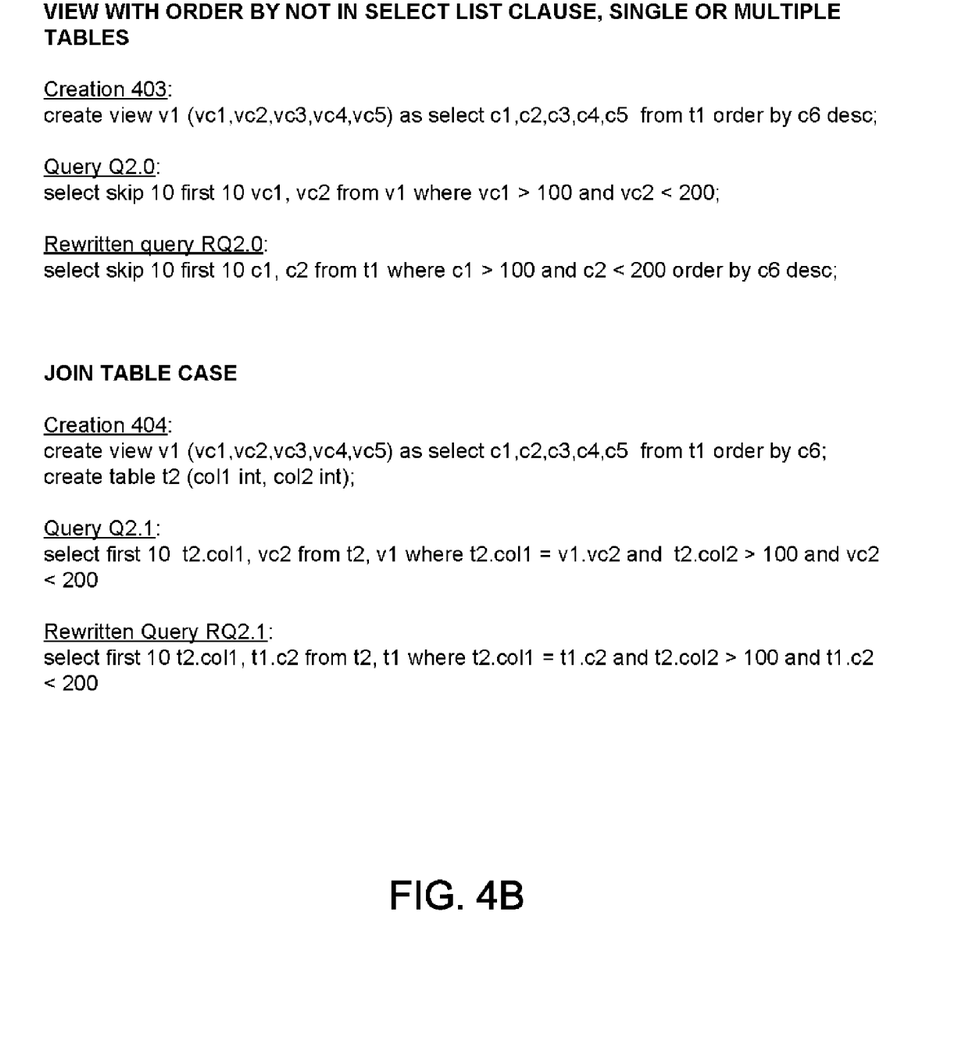

FIG. 4B illustrates example view creation statements 403 involving a single or multiple tables and a view with an order by clause that is not in the select list clause. Illustrated are example view creation statements 403 for creating view v1 that includes columns c1-c5 from table t1, ordered by column c6 of table t1 in descending order. Also illustrated in an example select statement for the query Q2.0. The query Q2.0 includes the predicates vc1>100 and vc2<200. After obtaining the view creation statements 403 (201) and the query Q2.0 (202), the method identifies the columns in the view v1 that are unnecessary for the query Q2.0 (203). Here, the query is to skip the first 10 rows of view v1 and return the next 10 rows of columns vc1 and vc2 from view v1. Thus, all other columns of the view v1 are unnecessary columns. To process the sort in the view definition, the method first processes the query predicates (302), and then determines whether the view sort is used in the query Q2.0 or affects the query results (303). In this example, the view sort is performed based on table column c6. Although table column c6 is a non-projected view column, a sort by column c6 will affect which rows in the view v1 is the first 10 rows and the next 10 rows. Thus, the view sort does affect the query results. The method proceeds to apply the view sort to the query Q2.0 (310). The method then rewrites the query Q2.0 to eliminate the unnecessary columns (205). The resulting rewritten query RQ2.0 can then be executed directly on the table t1, avoiding materializing the view v1.

Further, the sort based on column c6 is performed on the data set returned by the rewritten query RQ2.0, which is a smaller data set than the view data set.

FIG. 4B further illustrates example view creation statements 404 with a query Q2.1 that requires a table join between table t1 and table t2. After obtaining the view creation statements 404 (201) and the query Q2.1 (202), the method identifies the columns in the view v1 that are unnecessary for the query Q2.1 (203). Here, the query Q2.1 returns the first 10 rows of column t2.col1 from table t2 and column vc2 from view v1. Thus, all other columns of the view v1 are unnecessary. To process the sort in the view statement, the method first processes the query predicates (302), and then determines whether the view sort is used in the query Q2.1 or affects the query results (303). In this example, the view sort is by column c6, which does affect the query results. The method proceeds to apply the view sort to the query Q2.1 (310). The method then rewrites the query Q2.1 to eliminate the unnecessary columns (205). The resulting rewritten query RQ2.1 can then be executed directly on tables t1 and t2, without materializing the view v1.

Figure 4C:
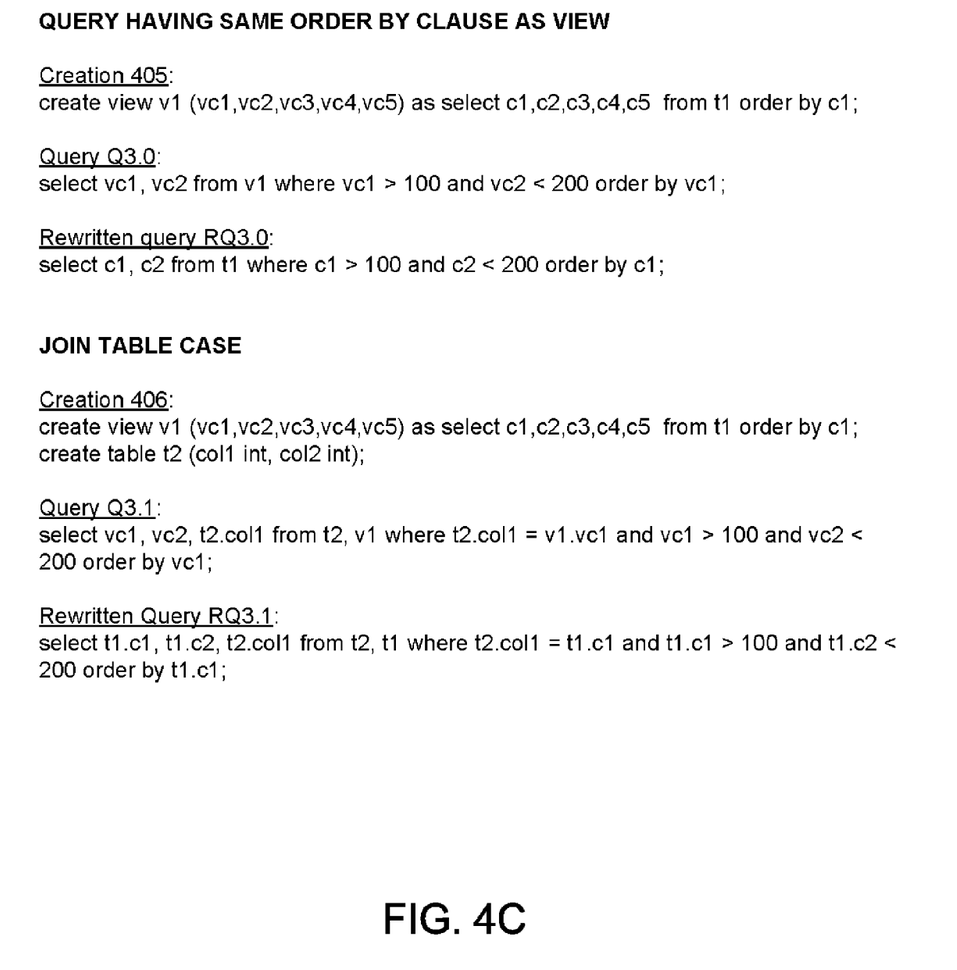

FIG. 4C illustrates example view creation statements 405 with a query having the same order by clause as the view. Illustrated are example view creation statements 405 that include columns from table t1, ordered by column c1. Also illustrated in an example select statement for the query Q3.0. The query Q3.0 includes the predicates vc1>100 and vc2<200 and a sort by column vc1. After obtaining the view creation statements 405 (201) and the query Q3.0 (202), the method identifies the columns in the view v1 that are unnecessary for the query Q3.0 (203). Here, the query is to return columns vc1 and vc2 from view v1. Thus, all other columns of the view v1 are unnecessary columns. To process the sort in the view definition, the method first processes the query predicates (302), and then determines whether the view sort is used in the query Q3.0 or affects the query results (303). In this example, the view sort is performed based on table column c1, which is a projected view column. Thus, the view sort is used in the query Q3.0. The method then determines whether the view sort matches the query sort (305). Here, the view sort is the same as the query sort, since view column vc1 is defined as column c1 of table t1. Thus, the view sort is redundant in query Q3.0. In response, the method does not apply the view sort to the query Q3.0 (306). The method then rewrites the query Q3.0 to eliminate the unnecessary columns and the redundant view sorts (205). The resulting rewritten query RQ3.0 can then be executed directly on the table t1, avoiding materializing the view v1. The sort is performed on the data set returned by the rewritten query RQ3.0, which is a smaller data set than the view data set. Further, only one sort by column c1 is performed, since the redundant sort in the view is avoided.

FIG. 4C further illustrates example view creation statements 406 with a query Q3.1 that requires a table join between table t1 and table t2. The query Q3.1 includes the predicates t2.col1=v1.vc1 and vc1>100 and vc2<200 and a sort by column vc1. After obtaining the view creation statements 406 (201) and the query Q3.1 (202), the method identifies the columns in the view v1 that are unnecessary for the query Q3.1 (203). Here, the query Q3.1 returns columns vc1 and vc2 from view v1 and column t2.col1 from table t2. Thus, all other columns of the view v1 are unnecessary. To process the sort in the view statement, the method first processes the query predicates (302), and then determines whether the view sort is used in the query Q3.1 or affects the query results (303). In this example, the view sort is performed based on table column c1, which is a projected view column. Thus, the view sort is used in the query Q3.1. The method then determines whether the view sort matches the query sort (305). Here, the view sort is the same as the query sort, since view column vc1 is defined as column c1 of table t1. Thus, the view sort is redundant in query Q3.1. In response, the method does not apply the view sort to the query Q3.1 (306). The method then rewrites the query Q3.1 to eliminate the unnecessary columns and the redundant view sorts (205). The resulting rewritten query RQ3.1 can then be executed directly on tables t1 and t2, without materializing the view v1. Further, only one sort by column c1 is performed since the redundant sort in the view is avoided.

Figure 4D:
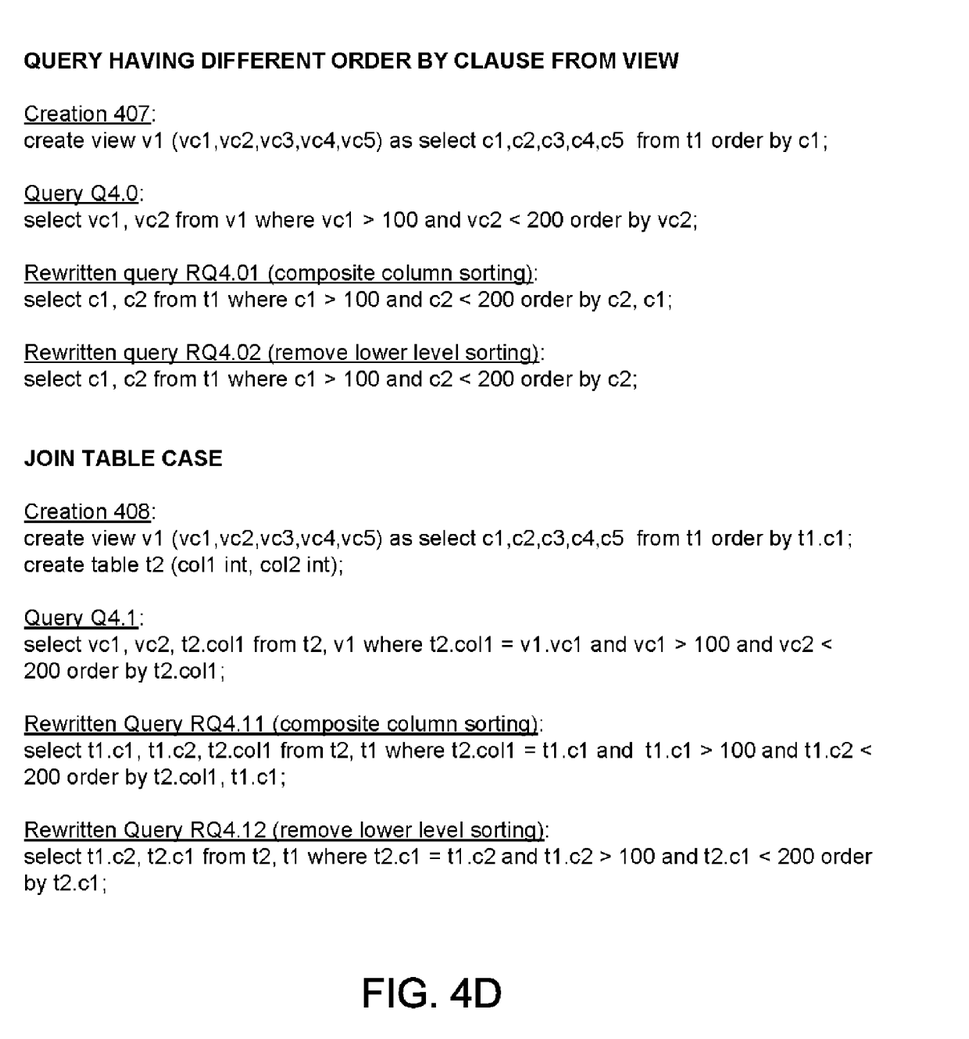

FIG. 4D illustrates example view creation statements 407 with a query having a different order by clause as the view. Illustrated are example view creation statements 407 that include columns from table t1, ordered by column c1. Also illustrated is an example select statement for the query Q4.0. The query Q4.0 includes the predicates vc1>100 and vc2<200 and a sort by column vc2. After obtaining the view creation statements 407 (201) and the query Q4.0 (202), the method identifies the columns in the view v1 that are unnecessary for the query Q4.0 (203). Here, the query Q4.0 is to return columns vc1 and vc2 from view v1. Thus, all other columns of the view v1 are unnecessary columns. To process the sort in the view definition, the method first processes the query predicates (302), and then determines whether the view sort is used in the query Q4.0 or affects the query results (303). In this example, the view sort is performed based on table column c1, which is a projected view column. Thus, the view sort is used in the query Q4.0. The method then determines that the query Q4.0 includes a sort (304) and determines whether the view sort matches the query sort (305). Here, the view sort is different from the query sort. The method can then respond in one of two ways. The method can choose to not apply the view to the query (306), i.e., remove the lower level sorting in the view definition. Alternatively, the method can choose to build a composite sort from the view sort and the query sort (307) and apply the composite sort to the query Q4.0 (308). The method then rewrites the query Q4.0 to eliminate the unnecessary columns and the redundant view sorts (205). Rewritten query RQ4.01 illustrates the query when the method chooses to build a composite sort. Here, the composite sort order is c2, c1 since the top query ordering has more precedence than the ordering in the view definition. Rewritten query RQ4.02 illustrates the query when the method chooses to not apply the view sort to the query. In this approach, only the top level query sort is preserved while the lower level sorting from the view statement is eliminated. The rewritten query RQ4.01 or RQ4.02 can then be executed directly on the table t1, avoiding materializing the view v1. The sort is performed on the data set returned by the rewritten query RQ4.01 or RQ4.02, which is a smaller data set than the view data set. Further, only one sort by column c2, c1 or column c2 is performed.

FIG. 4D further illustrates example view creation statements 408 with a query Q4.1 that requires a table join between table t1 and table t2. The query Q4.1 includes the predicates t2.col1=v1.vc1 and vc1>100 and vc2<200 and a sort by column t2.col1. After obtaining the view creation statements 408 (201) and the query Q4.1 (202), the method identifies the columns in the view v1 that are unnecessary for the query Q4.1 (203). Here, the query Q4.1 is to return columns vc1 and vc2 from view v1 and column t2.col1 from table t2. Thus, all other columns of the view v1 are unnecessary. To process the sort in the view statement, the method first processes the query predicates (302), and then determines whether the view sort is used in the query Q4.1 or affects the query results (303). In this example, the view sort is performed based on table column t1.c1, which is a projected view column. Thus, the view sort is used in the query Q4.1. The method then determines that the query Q4.1 includes a sort (304) and determines whether the view sort matches the query sort (305). Here, the view sort is different from the query sort. The method then can respond in one of two ways. The method can choose to not apply the view to the query (306), i.e., remove the lower level sorting in the view definition. Alternatively, the method can choose to build a composite sort from the view sort and the query sort (307) and apply the composite sort to the query Q4.1 (308). The method then rewrites the query Q4.1 to eliminate the unnecessary columns and the redundant view sorts (205). Rewritten query RQ4.11 illustrates the query when the method chooses to build a composite sort. Here, the composite sort order is t2.col2, t1.c1 since the top query ordering has more precedence than the ordering in the view definition. Rewritten query RQ4.12 illustrates the query when the method chooses to not apply the view sort to the query. The query RQ4.12 thus sorts by column t2.c1. In this approach, only the top level sorting is preserved while the lower level sorting form the view statement is eliminated. The rewritten query RQ4.11 or RQ4.12 can then be executed directly on the tables t1 and t2, avoiding materializing the view v1. The sort is performed on the data set returned by the rewritten query RQ4.11 or RQ4.12, which is a smaller data set than the view data set. Further, redundant or unnecessary sorting in the view is avoided.

FIG. 4E illustrates examples involving multiple order by clauses within nested views or queries. Illustrated are examples of nested view creation statements 409 for views v1, v2, v3, and v4. The top view v4 includes columns from table t1 ordered by column c4. Also illustrated is an example select statement for the query Q5.0. The query Q5.0 includes predicates t2.c1=v1.vc5 and vc5>100 and t2.c1<200 and no sorting. After obtaining the create view statements 409 (201) and the query Q5.0 (202), the method identifies the columns in the nested views v1-v4 that are unnecessary for the query Q5.0 (203). Here, each view of the nested views are "folded" into the query Q5.0. The query Q5.0 is to return columns t2.c1 from table t2 and column vc5 from view v1. Thus, all other columns of the views v1-v4 are unnecessary columns. To process the sort in the view definitions, the method first processes the query predicates (302), and then determines whether the nested view sorts are used in the query Q5.0 or affects the query results (303). In this example, the nested view sorts are performed on non-projected view columns. Thus, the nested view sorts are not used in the query Q5.0, and the method does not apply the nested view sorts to the query Q5.0 (309). The method then rewrites the query Q5.0 to eliminate the unnecessary columns and the unnecessary view sorts (205). The resulting rewritten query RQ5.0 can then be executed directly on tables t1 and t2, avoiding materializing the views v1-v4. Further, unnecessary sorts in the views are avoided.

FIG. 4E further illustrates example query Q5.1 with the same nested view creation statements 409 for views v1-v4. The query Q5.1 includes predicates t2.c1=v1.vc1 and vc1>100 and t2.c1<200 and a sort by column t2.c1. After obtaining the create view statements 409 (201) and the query Q5.1 (202), the method identifies the columns in the nested views v1-v4 that are unnecessary for the query Q5.1 (203). Here, each view of the nested views are "folded" into the query Q5.1. The query Q5.1 is to return columns t2.c1 from table t2 and columns vc1 and vc2 from view v1. Thus, all other columns of the views v1-v4 are unnecessary columns. To process the sort in the view definitions, the method first processes the query predicates (302), and then determines whether the nested view sorts are used in the query Q5.1 or affects the query results (303). In this example, the sorting in views v3 and v4 are on columns c3 and c4 of table t1, respectively. These columns are non-projected view columns and thus are not to be applied to the query Q5.1 (309). The sorting in views v1 and v2 are on columns vc1 and vc2, which are used in the query (303). Since the query includes a sort by t2.c1 (304), the method determines whether the view sorts by v1 and v2 match the query sort (305). Here, they do not match. Assume that the method chooses to build a composite sort from the sorts in the view definitions for v1 and v2 and the query Q5.1 (307). Here, the composite sort would be built on columns t2.c1, t1.c1, and t1.c2, with the ordering of the nested views preserved. The composite sort is applied to the query Q5.1 (308). The method then rewrites the query Q5.1 to eliminate the unnecessary columns and the unnecessary view sorts (205), resulting in rewritten query RQ5.1.

FIG. 4E further illustrates example view execution statements 410 with a nested query Q5.2. After obtaining the create view statements (201) and the nested query Q5.2 (202), the method identifies the columns in the views v1 and v2 that are unnecessary for the nested query Q5.2 (203). Here, the views v1 and v2 are "folded" into the query Q5.2. The query Q5.2 is to return column vc1 from views v1 and v2. Thus, all other columns of the views v1 and v2 are unnecessary columns. To process the sort in the view definitions, the method first processes the nested query predicates (302), and then determines whether the view sorts in v1 and v2 are used in the query Q5.2 or affects the query results (303). In this example, the sorting in views v1 and v2 are defined as column c1 of table t1. This column in both views v1 and v2 are projected view columns and thus will affect the query results. The method determines the query Q5.2 includes a sort (304) and determines whether the view sorts match the query sort (305). Here, the nested query sort, once folded into the top query, is by column c1. Thus, the view sort matches the nested query sort, and the method does not apply the view sort to the query Q5.2 (306). The method then rewrites the query Q5.2 to eliminate the unnecessary columns and unnecessary and duplicate view sorts (205), resulting in rewritten query RQ5.2.

Figure 5A:
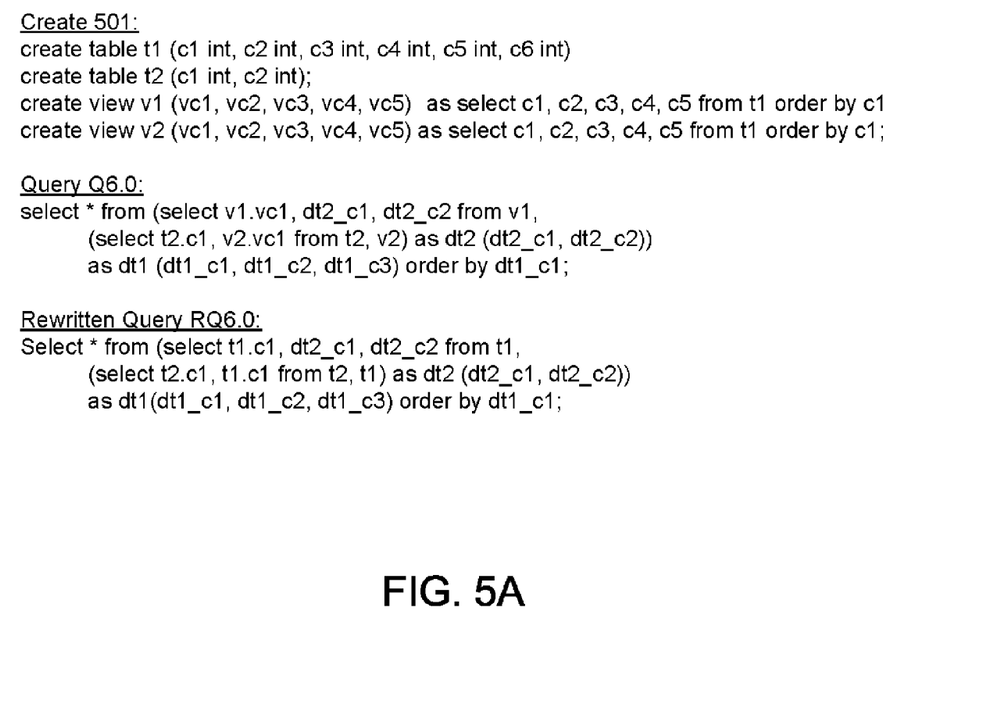
FIG. 5A-5C illustrate further example vie statements according to an embodiment of the present invention.
Figure 5B:
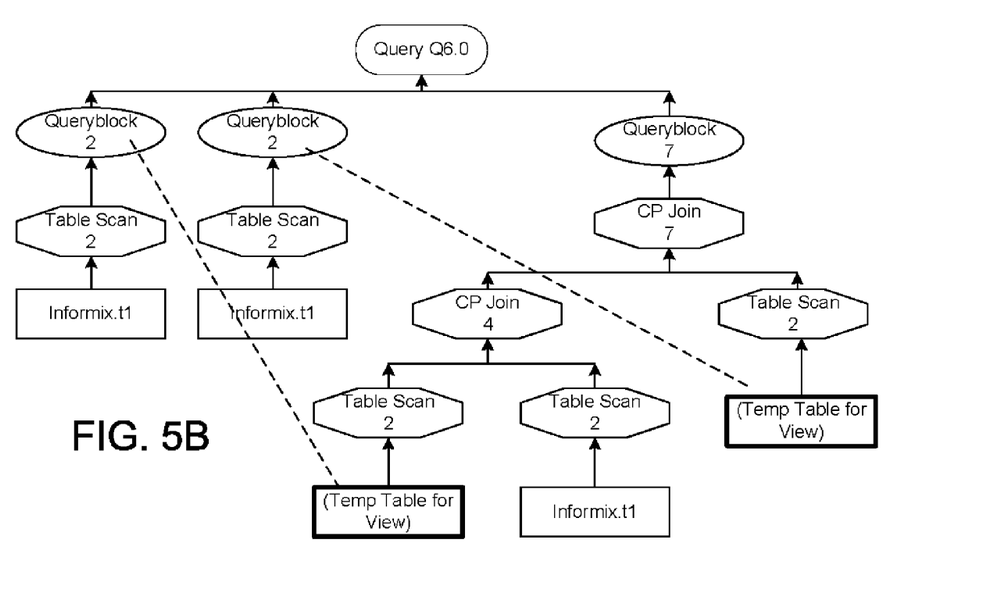
Figure 5C:
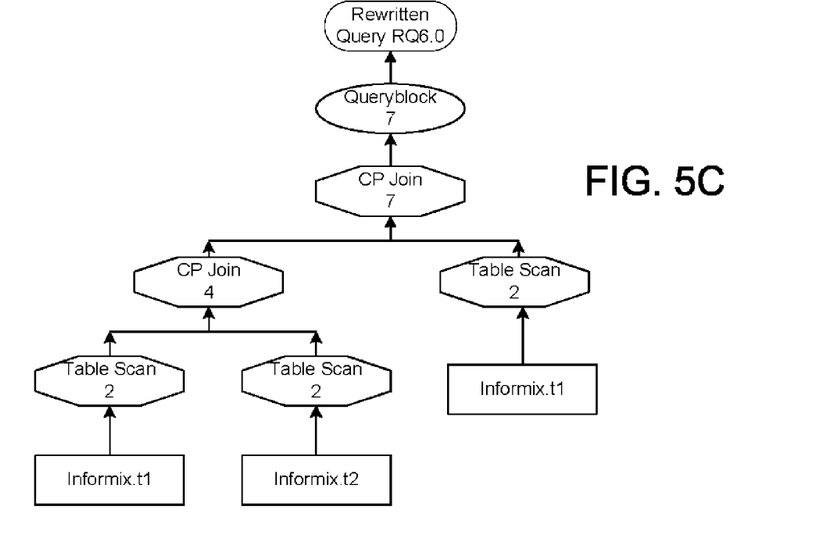

FIGS. 5A-5C illustrate further example view statements. Illustrated in FIG. 5A are example view creation statements 501 for views v1 and v2, both ordered by column c1 of table t1. Also illustrated is an example select statement for the query Q6.0. After obtaining the create view statements 501 (201) and the query Q6.0 (202), the method identifies the columns in the views v1 and v2 that are unnecessary for the query Q6.0 (203). Here, the views v1 and v2 are "folded" into the query Q6.0. The query Q6.0 is to return column vc1 from views v1 and v2. Thus, all other columns of the views v1 and v2 are unnecessary columns. Here, there are no query predicates (302). The method determines whether the view sorts in v1 and v2 are used in the query Q6.0 or affects the query results (303). In this example, the sorting in views v1 and v2 are defined as column c1 of table t1. This column in both views v1 and v2 are projected view columns and thus will affect the query results. The method determines that query Q6.0 includes a sort (304) and determines that the view sort does not match the query sort (305). Here, the method decides not to apply the view sort to the query Q6.0

(306). The method then rewrites query Q6.0 to remove the unnecessary columns (205), resulting in rewritten query RQ6.0.

FIG. 5B illustrates an example explain plan for the original query Q6.0. FIG. 5C illustrates an example explain plan for the rewritten query RQ6.0. This example assumes that the queries Q6.0 and RQ6.0 are to be executed in an Informix™ server, however, the same principles may be applied to other types of servers. Note here that the explain plan for the original query Q6.0 (in FIG. 5B) includes the materialization of the views v1 and v2 into temporary tables (Temp Table for View). In contrast, the explain plan for the rewritten query RQ6.0 (in FIG. 5C) does not.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for efficient query processing on ordered views by a computing device comprising a processor, comprising:
   processing a query for database data in a database system that does not support view definitions containing a sorting clause, the query processed against an ordered view without materialization of the ordered view, wherein the ordered view comprises operations directed to at least one database table, wherein a view definition that defines the ordered view comprises at least one sorting clause, wherein the view definition comprising the at least one sorting clause is not supported by the database system by:
      obtaining the view definition for the ordered view;
      obtaining the query to be executed on the database data, wherein the query comprises operations directed to the ordered view;
      identifying any columns in the view definition that are unnecessary for the query;
      after processing any predicates of the query, identifying any sorts in the view definition that are unnecessary or redundant in the query, wherein the sorts in the view definition are defined by the at least one sorting clause, and are not supported by the database system; and
      rewriting the query to eliminate the unnecessary columns, and unnecessary or redundant sorts, wherein the query is rewritten to comprise operations directed only to the at least one database table, wherein the resulting rewritten query is processed efficiently due to:
         i) the elimination of the unnecessary columns;
         ii) the elimination of unnecessary or redundant sorts;
         iii) an effective processing of the ordered view, comprising the at least one sorting clause, without materialization; and
         iv) fewer rows of data returned when the rewritten query is executed.

2. The method of claim 1, further comprising:
   executing the rewritten query.

3. The method of claim 1, wherein the identifying any sorts in the view definition that are unnecessary or redundant in the query comprises:
   processing the query predicates;
   determining that the view definition comprises one or more view sorts;
   determining whether the view sort is used in the query or affects query results; and
   in response to determining that the view sort is not used in the query and does not affect the query results, not applying the view sort to the query.

4. The method of claim 1, wherein the identifying any sorts in the view definition that are unnecessary or redundant in the query comprises:
   processing the query predicates;
   determining that the view definition comprises one or more view sorts;
   determining whether the view sort is used in the query or affects query results;
   in response to determining that the view sort is used in the query or does affect the query results, determining whether the query comprises one or more sorts; and
   in response to determining that the query does not comprise any sorts, applying the view sort to the query.

5. The method of claim 1, wherein the identifying any sorts in the view definition that are unnecessary or redundant in the query comprises:
   processing the query predicates;
   determining that the view definition comprises one or more view sorts;
   determining whether the view sort is used in the query or affects query results;
   in response to determining that the view sort is used in the query or does affect the query results, determining whether the query comprises one or more query sorts;
   in response to determining that the query comprises one or more query sorts, determining whether the view sort matches the query sort; and
   in response to determining that the view sort matches the query sort, not applying the view sort to the query.

6. The method of claim 5, wherein the identifying any sorts in the view definition that are unnecessary or redundant in the query further comprises:
   in response to determining that the view sort does not match the query sort, not applying the view sort to the query.

7. The method of claim 5, wherein the identifying any sorts in the view definition that are unnecessary or redundant in the query further comprises:
   in response to determining that the view sort does not match the query sort, building a composite sort from the view sort and the query sort; and
   applying the composite sort to the query.

8. A non-transitory computer readable storage media, not including signals per se, containing a computer program product for efficient query processing on ordered views comprising:
   the computer readable storage media having computer readable program code embodied therewith, the computer readable program code configured to:
   process a query for database data in a database system that does not support view definitions containing a sorting clause, the query processed against an ordered view, without materialization of the ordered view, wherein the ordered view comprises operations directed to at least one database table, wherein a view definition that defines the ordered view comprises at least one sorting clause, wherein the view definition comprising the at least one sorting clause is not supported by the database system by:
  obtaining the view definition for the ordered view;
  obtaining the query to be executed on the database data, wherein the query comprises operations directed to the ordered view;
  identifying any columns in the view definition that are unnecessary for the query;
  after processing any predicates of the query, identifying any sorts in the view definition that are unnecessary or redundant in the query, wherein the sorts in the view definition are defined by the at least one sorting clause, and are not supported by the database system; and
  rewriting the query to eliminate the unnecessary columns, and unnecessary or redundant sorts, wherein the query is rewritten to comprise operations directed only to the at least one database table, wherein the resulting rewritten query is processed efficiently due to:
    i) the elimination of the unnecessary columns;
    ii) the elimination of unnecessary or redundant sorts;
    iii) an effective processing of the ordered view, comprising the at least one sorting clause, without materialization; and
    iv) fewer rows of data returned when the rewritten query is executed.

9. The computer readable storage media of claim 8, wherein the computer readable program code is further configured to:
  execute the rewritten query.

10. The computer readable storage media of claim 8, wherein the computer readable program code configured to identify any sorts in the view definition that are unnecessary or redundant in the query is further configured to:
  process the query predicates;
  determine that the view definition comprises one or more view sorts;
  determine whether the view sort is used in the query or affects query results; and
  in response to determining that the view sort is not used in the query and does not affect the query results, not apply the view sort to the query.

11. The computer readable storage media of claim 8, wherein the computer readable program code configured to identify any sorts in the view definition that are unnecessary or redundant in the query are further configured to:
  process the query predicates;
  determine that the view definition comprises one or more view sorts;
  determine whether the view sort is used in the query or affects query results;
  in response to determining that the view sort is used in the query or does affect the query results, determine whether the query comprises one or more sorts; and
  in response to determining that the query does not comprise any sorts, apply the view sort to the query.

12. The computer readable storage media of claim 8, wherein the computer readable program code configured to identify any sorts in the view definition that are unnecessary or redundant in the query are further configured to:
  process the query predicates;
  determine that the view definition comprises one or more view sorts;
  determine whether the view sort is used in the query or affects query results;
  in response to determining that the view sort is used in the query or does affect the query results, determine whether the query comprises one or more query sorts;
  in response to determining that the query comprises one or more query sorts, determine whether the view sort matches the query sort; and
  in response to determining that the view sort matches the query sort, not apply the view sort to the query.

13. The computer readable storage media of claim 12, wherein the computer readable program code configured to identify any sorts in the view definition that are unnecessary or redundant in the query further are further configured to:
  in response to determining that the view sort does not match the query sort, not apply the view sort to the query.

14. The computer readable storage media of claim 12, wherein the computer readable program code configured to identify any sorts in the view definition that are unnecessary or redundant in the query further are further configured to:
  in response to determining that the view sort does not match the query sort, build a composite sort from the view sort and the query sort; and
  apply the composite sort to the query.

15. A system, comprising:
  a processor; and
  a computer readable storage media having computer readable program code embodied therewith executable by the processor, the computer readable program code configured to:
  process a query for database data in a database system that does not support view definitions containing a sorting clause, the query processed against an ordered view, without materialization of the ordered view, wherein the ordered view comprises operations directed to at least one database table, wherein a view definition that defines the ordered view comprises at least one sorting clause, wherein the view definition comprising the at least one sorting clause is not supported by the database system by:
    obtaining the view definition for the ordered view;
    obtaining the query to be executed on the database data, wherein the query comprises operations directed to the ordered view;
    identifying any columns in the view definition that are unnecessary for the query;
    after processing any predicates of the query, identifying any sorts in the view definition that are unnecessary or redundant in the query, wherein the sorts in the view definition are defined by the at least one sorting clause, and are not supported by the database system; and
    rewriting the query to eliminate the unnecessary columns, and unnecessary or redundant sorts, wherein the query is rewritten to comprise operations directed only to the at least one database table, wherein the resulting rewritten query is processed efficiently due to:
      i) the elimination of the unnecessary columns;
      ii) the elimination of unnecessary or redundant sorts;
      iii) an effective processing of the ordered view, comprising the at least one sorting clause, without materialization; and
      iv) fewer rows of data returned when the rewritten query is executed.

16. The system of claim 15, wherein the computer readable program code is further configured to:
  execute the rewritten query.

17. The system of claim 15, wherein the computer readable program code configured to identify any sorts in the view definition that are unnecessary or redundant in the query is further configured to:
  process the query predicates;
  determine that the view definition comprises one or more view sorts;
  determine whether the view sort is used in the query or affects query results; and
  in response to determining that the view sort is not used in the query and does not affect the query results, not apply the view sort to the query.

18. The system of claim 15, wherein the computer readable program code configured to identify any sorts in the view definition that are unnecessary or redundant in the query are further configured to:
  process the query predicates;
  determine that the view definition comprises one or more view sorts;
  determine whether the view sort is used in the query or affects query results;
  in response to determining that the view sort is used in the query or does affect the query results, determine whether the query comprises one or more sorts; and
  in response to determining that the query does not comprise any sorts, apply the view sort to the query.

19. The system of claim 15, wherein the computer readable program code configured to identify any sorts in the view definition that are unnecessary or redundant in the query are further configured to:
  process the query predicates;
  determine that the view definition comprises one or more view sorts;
  determine whether the view sort is used in the query or affects query results;
  in response to determining that the view sort is used in the query or does affect the query results, determine whether the query comprises one or more query sorts;
  in response to determining that the query comprises one or more query sorts, determine whether the view sort matches the query sort; and
  in response to determining that the view sort matches the query sort, not apply the view sort to the query.

20. The system of claim 19, wherein the computer readable program code configured to identify any sorts in the view definition that are unnecessary or redundant in the query further are further configured to:
  in response to determining that the view sort does not match the query sort, either not apply the view sort to the query or build a composite sort from the view sort and the query sort; and
  apply the composite sort to the query when the composite sort is built.

* * * * *